(12) United States Patent
Marshall

(10) Patent No.: US 8,001,784 B2
(45) Date of Patent: Aug. 23, 2011

(54) HYDROTHERMAL ENERGY AND DEEP SEA RESOURCE RECOVERY SYSTEM

(76) Inventor: Bruce Marshall, Santa Paula, CA (US)

( * ) Notice: Subject to any disclaimer, the term of this patent is extended or adjusted under 35 U.S.C. 154(b) by 983 days.

(21) Appl. No.: 11/890,735

(22) Filed: Aug. 6, 2007

(65) Prior Publication Data
US 2009/0013690 A1    Jan. 15, 2009

Related U.S. Application Data

(60) Provisional application No. 60/949,563, filed on Jul. 13, 2007.

(51) Int. Cl.
*F03G 7/00* (2006.01)
(52) U.S. Cl. .................. 60/641.2; 60/641.6
(58) Field of Classification Search ............ 60/641.2, 60/641.6, 641.7
See application file for complete search history.

(56) References Cited

U.S. PATENT DOCUMENTS

| | | | | |
|---|---|---|---|---|
| 4,407,351 A * | 10/1983 | Backlund | ............ | 165/45 |
| 4,575,282 A * | 3/1986 | Pardue et al. | ............ | 405/228 |
| 5,582,691 A * | 12/1996 | Flynn et al. | ............ | 203/11 |
| 6,149,855 A * | 11/2000 | Watson | ............ | 264/334 |
| 6,551,541 B1 * | 4/2003 | Watson | ............ | 264/299 |
| 2002/0145288 A1 * | 10/2002 | Van Breems | ............ | 290/42 |
| 2007/0056770 A1 * | 3/2007 | Fraser | ............ | 175/14 |
| 2007/0084768 A1 * | 4/2007 | Barber | ............ | 210/143 |

* cited by examiner

*Primary Examiner* — Hoang M Nguyen
(74) *Attorney, Agent, or Firm* — Kelly Lowry & Kelley, LLP

(57) ABSTRACT

A system that utilizes the naturally superheated fluids available from hydrothermal vents to harness the almost limitless quantities of heat energy they contain. It consists of one major system that has three parts: (i) funnel, (ii) pipes, and (iii) any combination of several mechanical attachments. The recovered heat energy will then be used to drive steam turbines or other equipment for electricity generation, water desalination, or any other thermal energy use. It could also be simultaneously or separately fed into resource recovery equipment for the recovery of valuable metals, minerals, and chemicals without system modification.

33 Claims, 5 Drawing Sheets

HYDROTHERMAL ENERGY AND DEEP SEA RESOURCE RECOVERY SYSTEM

RELATED APPLICATIONS

This application is based on and claims priority from my U.S. provisional patent application Ser. No. 60/949,563, filed Jul. 13, 2007, for Hydrothermal Energy And Deep Sea Resource Recovery System, the full contents of which are incorporated herein by reference.

BACKGROUND OF THE INVENTION

1. Field of the Invention

This invention relates generally to a system that recovers superheated fluids from deep-ocean hydrothermal vents and allows those fluids to be utilized as a thermal energy source. In particular, the system is configured to direct a flow of superheated deep-ocean hydrothermal fluid through a reliable mechanism to the surface, for use by any other mechanism suitable for utilizing the heat; for example, generating electricity or desalinating water. The same device also provides a reliable mechanism for deep-ocean resource recovery of metals and minerals, simultaneous with or separate from thermal energy recovery, and without modification.

2. Description of Related Art

Global requirements for energy and fresh water are always rising, and it is becoming increasingly difficult to find new sources of supply for consumers. Concerns about global warming and excess greenhouse gasses, as well as the very high cost of fossil fuels make the search for clean energy from renewable sources even more imperative and desirable. The system disclosed herein provides the first disclosed method for harnessing this vast and inexhaustible natural source of energy.

Mining is also difficult and expensive on the earth's surface, and political turmoil in some areas rich in resources can limit access to needed and otherwise available materials. Up until now, recovering mineral resources in great quantities from the deep ocean has been nothing more than a dream. The system disclosed herein provides the first practical means for extracting those resources.

The most basic form of energy is heat. Whether from burning oil or coal, a nuclear reaction, or from the earth's magma, heat is what ultimately fuels almost all electric generation, water desalination, and other work processes.

Scientists have discovered deep-sea hydrothermal vents in places all over the world. Ocean water is forced into fissures in the sea floor by the pressures of ocean depth, eventually reaching deep within the earth's core. This water is superheated by the magma to over 750° Fahrenheit (400° C.) and it picks up rare elements from deep within the earth in the process. A continuous flow of this superheated water escapes back into the ocean through hydrothermal vents, with hydrothermal fluid exiting the sea floor at velocities of between 1 and 5 meters per second (3.6-18 km/hr, or 2.25-11 mph). It is estimated that the energy escaping from just the known hydrothermal vents is about 17,000,000 MW per year, or about equal to the entire human consumption of electricity on the planet for a year. It should also be noted that there are tens of thousands of miles of ocean floor where vents should be located that have never even been explored.

Since the water escaping is of a fundamentally different chemical composition than the surrounding seawater because of its exposure to magma, the term "fluid" will be used in the following description, even though it is composed primarily of seawater.

Although there are a few geothermal energy recovery inventions, none has been claimed for hydrothermal energy recovery, and none can be used to harness the naturally-occurring superheated seawater or other fluid from hydrothermal vents deep below the ocean in any manner, nor does any bring such ocean fluid to the surface in a heated state in order to take advantage of the temperature differential for energy utilization. Furthermore, none has been claimed as a system to recover deep-ocean minerals, metals, or chemicals. No anticipating or suggestive relevant art was found to make any claims similar to those of the present invention. The following will be referenced:

1. One such invention (U.S. Pat. No. 5,515,679), provides methods and apparatus for bringing the thermal energy found in subterranean hot rock to the surface. However, rock structures are fundamentally different from the ocean. Heat is transferred to the working fluid by conduction through the walls of uninsulated pipe in direct contact with rock all along its length. The present invention uses naturally occurring ocean fluid from hydrothermal vents as the heat source, and heat is only introduced to the system at the bottom of the ocean. The invention disclosed herein is also without modification a deep ocean mineral resource recovery apparatus.

2. Another previous invention, (U.S. Pat. No. 4,054,176), provides systems for conversion to electricity of geothermal energy obtained from heat flow through solid rock materials. It receives its heat in a very similar to the manner in which U.S. Pat. No. 5,515,679 does. As previously noted, the present invention only introduces heat at the bottom of the system. U.S. Pat. No. 4,054,176 also limits conversion of this heat energy just to electricity. The energy obtained from hydrothermal vents can be used for electricity generation, water desalination, or any other thermal energy use, and this invention also provides the ability to recover mineral resources from ocean depths without modification.

3. In yet another invention (U.S. Pat. No. 7,124,584), a system is disclosed for generating energy from a geothermal heat source. This invention provides a means for injecting fluid into a subterranean formation, and also contains a mechanism configured for extracting the injected fluid from said formation after being heated by it. The present invention uses no such system of injection and extraction, nor does it utilize subterranean formations in any way. The present invention uses naturally occurring superheated fluid from deep ocean hydrothermal vents for electricity generation, water desalination, or any other thermal energy use. The present invention also provides a means of resource recovery from ocean depths without modification.

BRIEF SUMMARY OF THE INVENTION

Worldwide demand for energy is skyrocketing, putting extreme pressure on providers to continuously find and offer adequate supplies to consumers. In accordance with one embodiment, superheated hydrothermal ocean fluid from hydrothermal vents is brought from the ocean floor to the surface using a mechanism made of cylindrical pipes and a funnel. Less dense and superheated hydrothermal fluid is conveyed to the surface through vent flow velocity, convection, conduction, and flash steam pressure via an insulated pipe system and funnel, which exerts a venturi effect upon the moving fluid to increase its velocity. The recovered hydrothermal fluid is then used as a source of heat for generating electricity, water desalination, or any other thermal energy use. It could also be simultaneously or separately fed into resource recovery equipment for the removal of valuable minerals, metals, and chemicals.

BRIEF DESCRIPTION OF THE DRAWINGS

Figure 1:
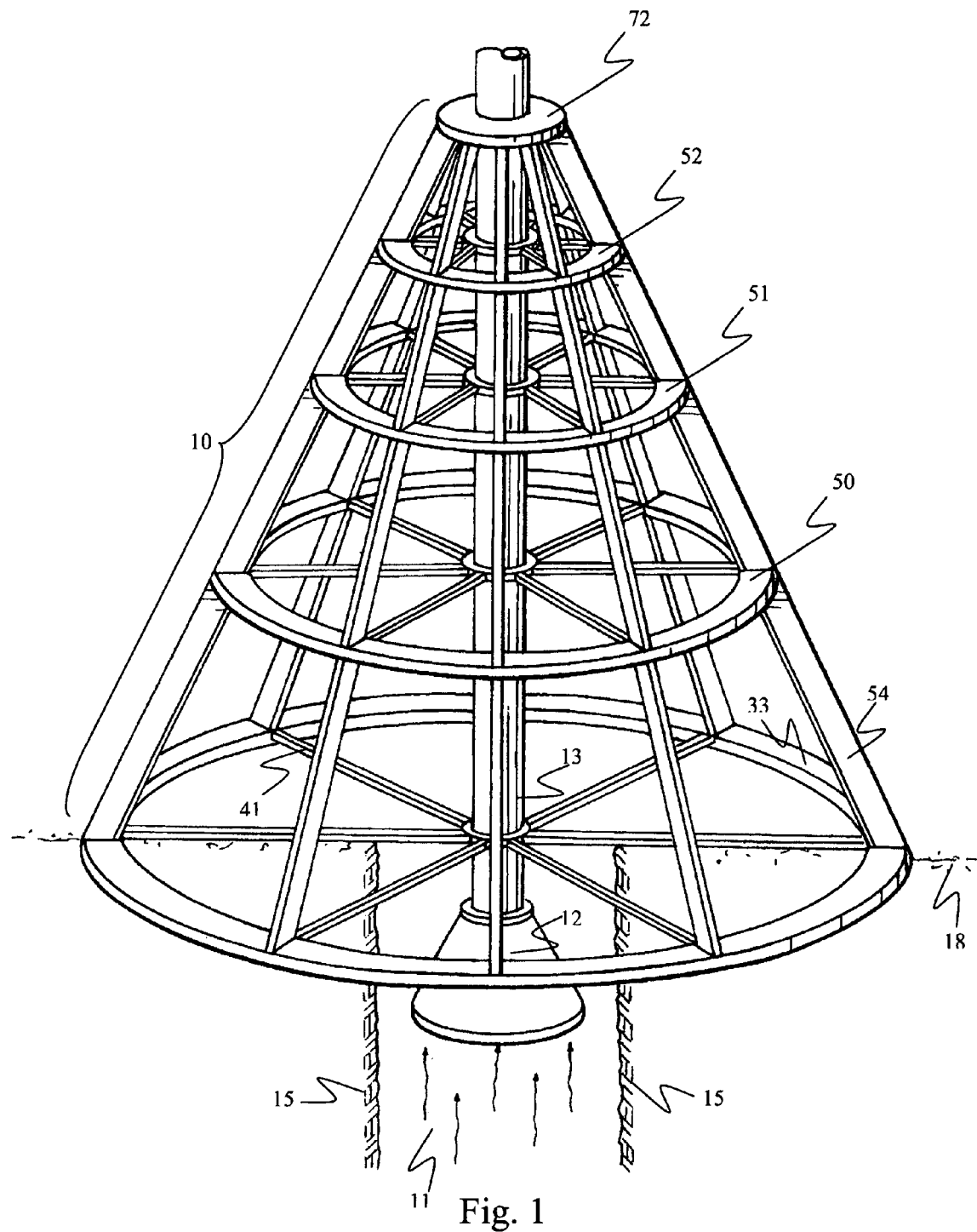
Figure 2:
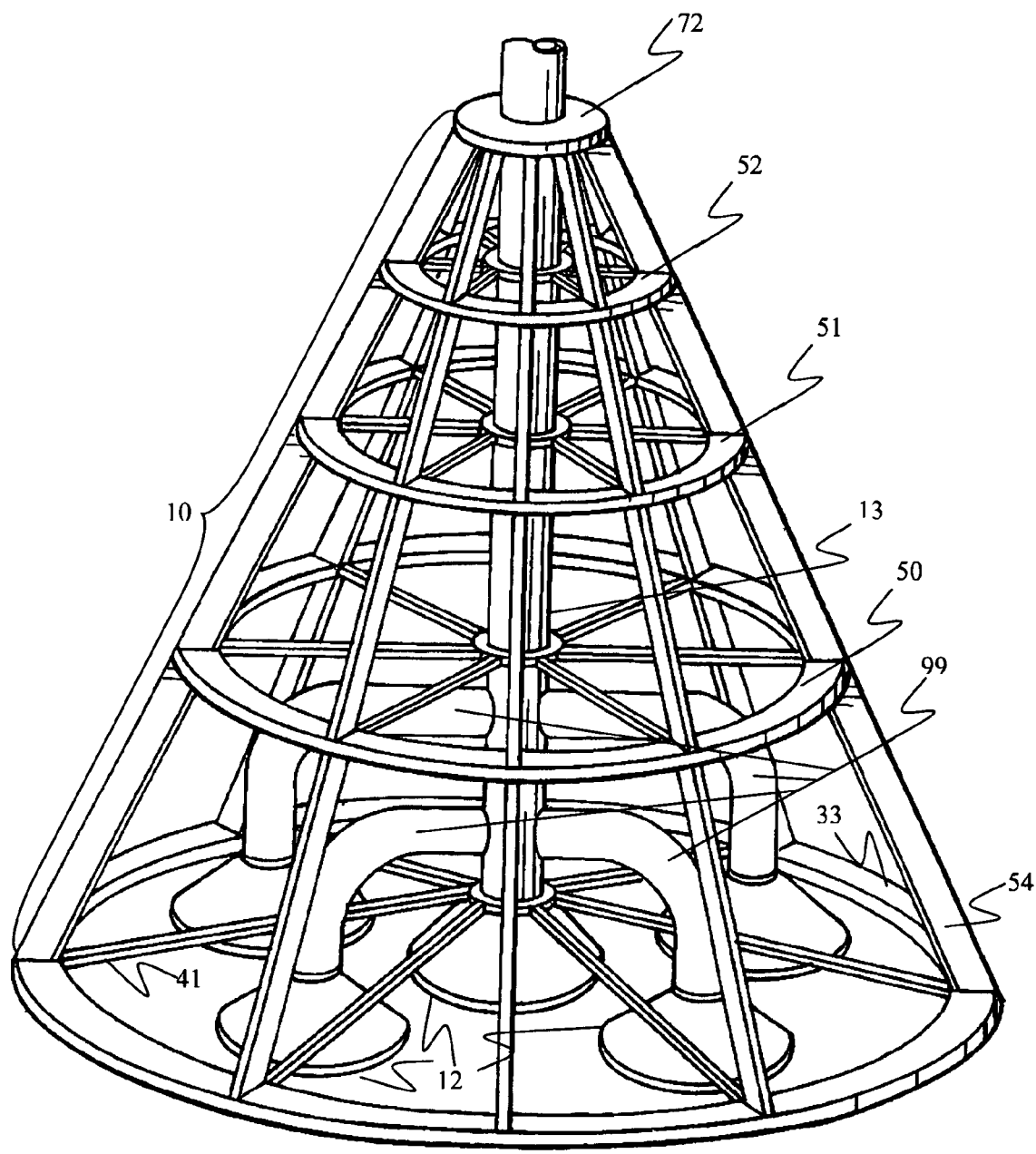
Figure 3:
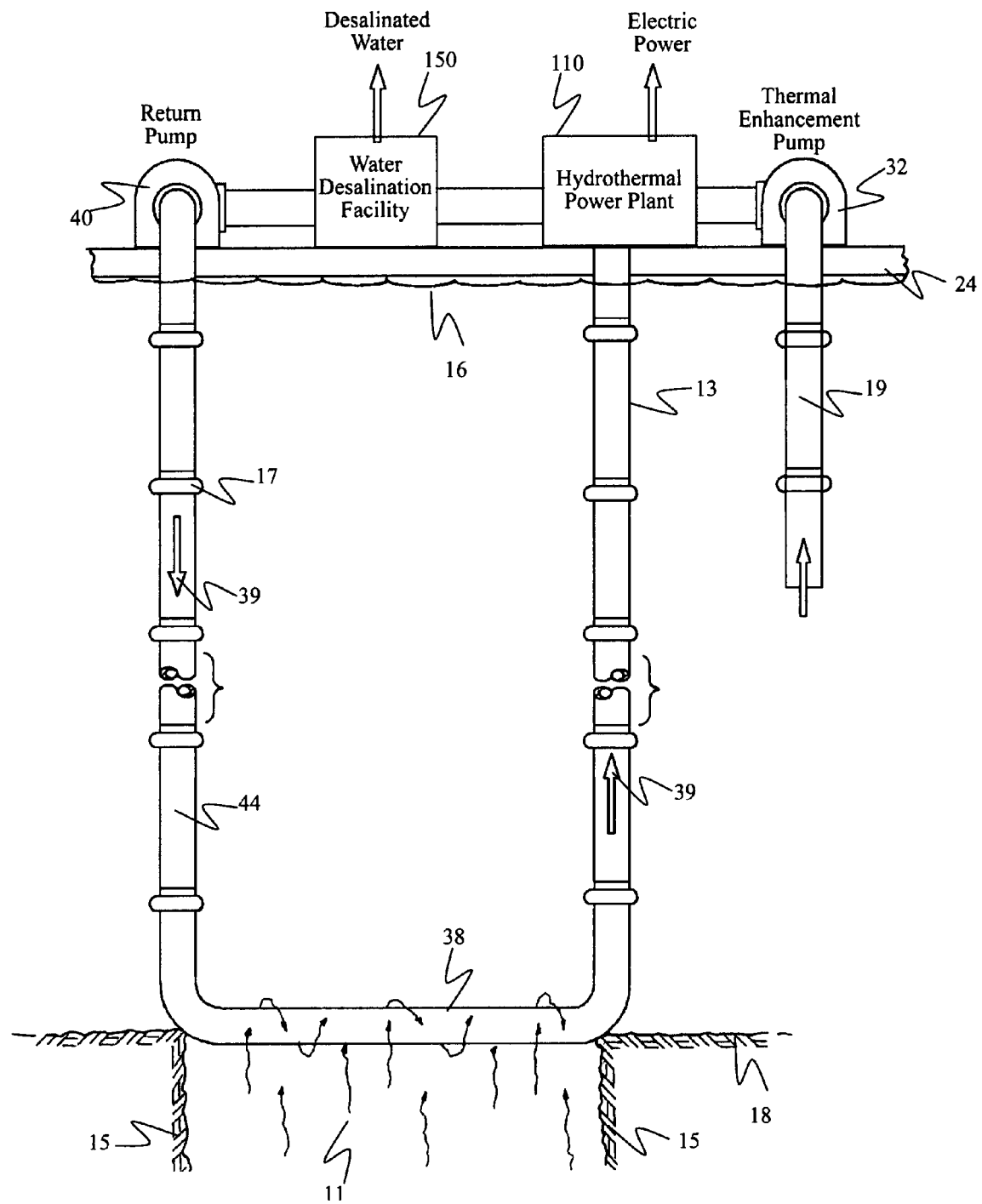
Figure 4:
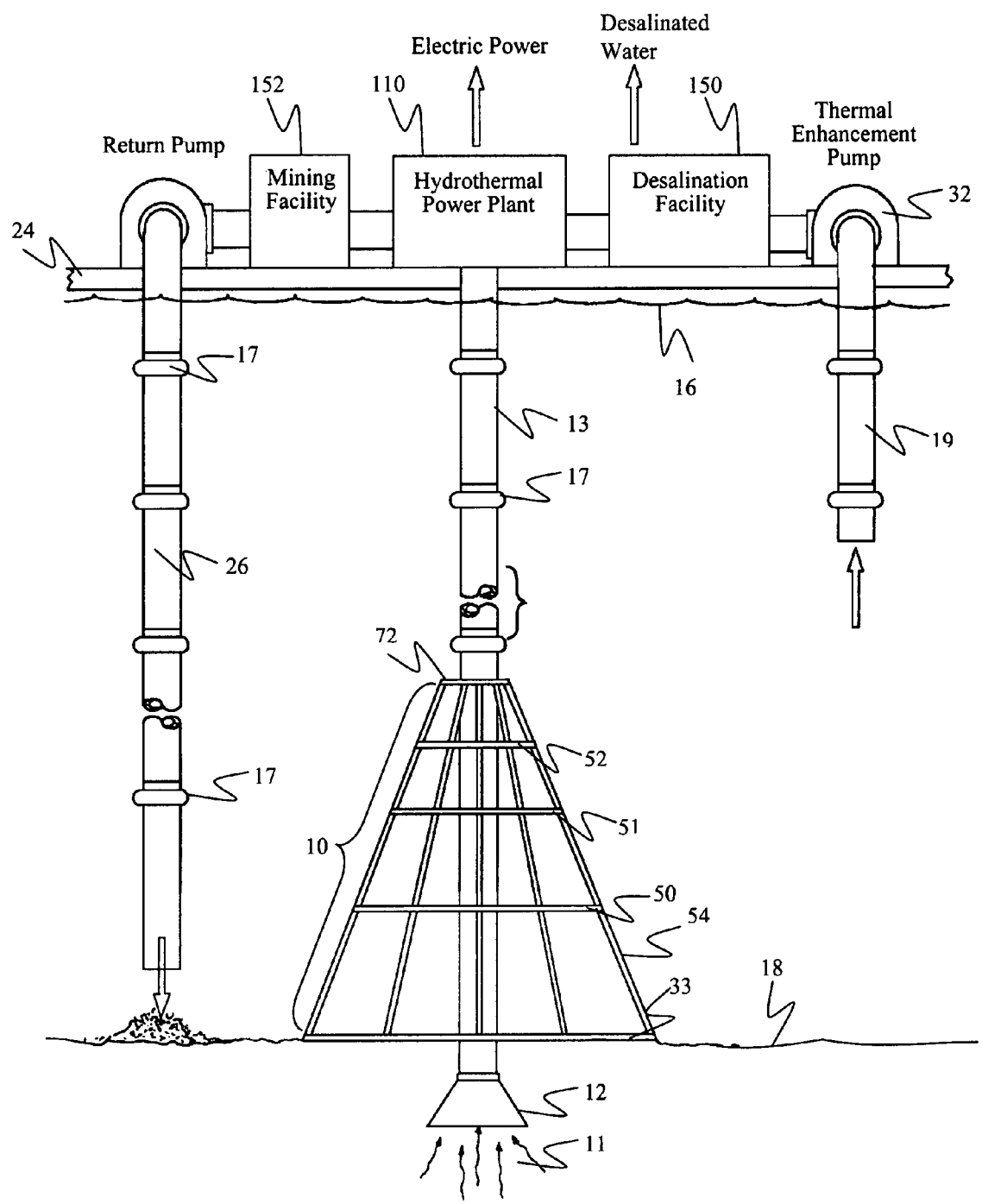
Figure 5:
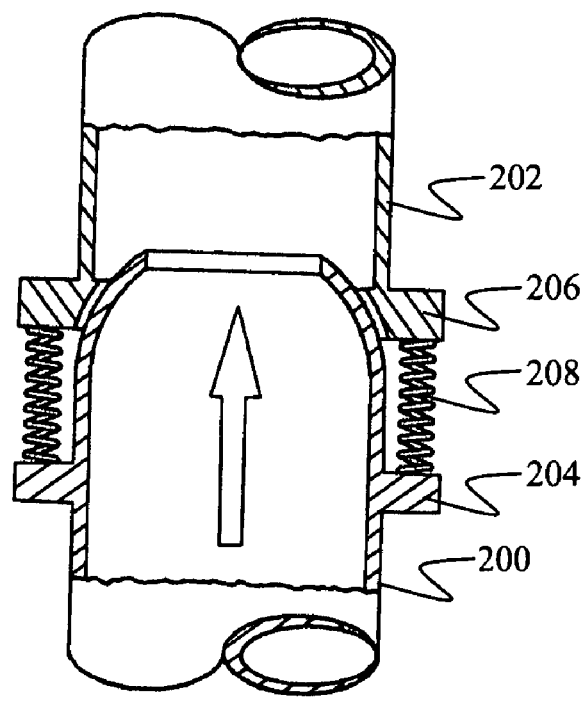
Figure 5:
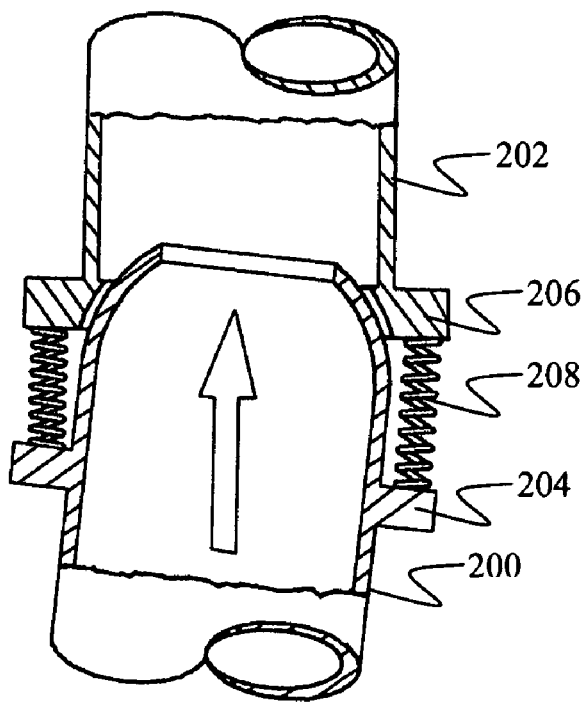

Having thus described the invention in general terms, reference will now be made to the accompanying drawings in which:

FIG. 1 shows a preferred apparatus for capturing ocean hydrothermal vent fluid from a single large hydrothermal vent;

FIG. 2 shows a modified apparatus for capturing hydrothermal vent fluid from hydrothermal vents in a field that contains several relatively small hydrothermal vents in a confined geographic area;

FIG. 3 shows a closed-loop system, utilizing heat exchangers positioned over the vents and which exchangers carry clean fluid, liquid, or gas into an insulated pipe for transit to the surface, with an insulated return pipe which carries the fluid back to the heat exchanger for reheating;

FIG. 4 illustrates a flow chart showing the utilization of hydrothermal fluid as a source for generating electricity, water desalination, or any other thermal energy use, as well as for resource recovery; and FIG. 5 shows the detail of one possible embodiment of flexible pipe joint.

DETAILED DESCRIPTION OF THE PREFERRED EMBODIMENT

The present invention now will be described more fully hereinafter with reference to the accompanying Drawing, in which a preferred embodiment of the invention is shown. This invention may, however, be embodied in many different but related forms and should not be construed as limited to embodiments set forth herein; rather, these embodiments are provided so that this disclosure will be thorough and complete, and will fully convey the scope of the invention to those skilled in the art. In the Drawing, like numbers refer to the same elements throughout the Figures of the Drawing.

Normally, fluid superheated by the magma is ejected into the ocean, and its heat energy is then quickly dissipated into the frigid 2° C. (35° F.) seawater and moved away by ocean currents. The extremely high mineral content is normally precipitated out of the fluid and is deposited on the ocean floor surrounding the vent. The invention disclosed herein traps mineral-rich, superheated fluid inside a collecting means for transport to the surface, before it can be cooled by or react to ambient conditions. The hydrothermal fluid rises from the ocean floor to the surface of the ocean through a large, heavily insulated duct because of convection, conduction, vent flow velocity, and flash steam pressure induced as the ambient pressure diminishes as the heated fluid ascends, as well as because of the lower density and intense heat-energy contained in the fluid. Surface pumps could also be used to increase velocity and flow of the hydrothermal fluid to the surface in a manner consistent with the operation thermal differential enhancement pipe discussed later.

Hydrothermal vents (15) are located at a depth of about 7,500 feet (2,300 m) and can occur anywhere along 45,000 miles (72,000 km) of Mid-Ocean Ridges.

To harness these natural phenomena, seagoing construction ships would lower a structure such as a conically shaped framework (10) containing a large funnel (12) connected to insulated pipe sections (13) over a vent (15) on the ocean floor. The funnel (12) is made of heavy, well-insulated material, and its output end would have a diameter of up to three feet or more, depending on vent (15) size and flow, with the bell of the funnel (12) considerably wider. The bell of the funnel (12) is preferably contained within the conically shaped framework (10) or other similar structure (not shown) that would hold the funnel (12) and attached pipe sections positioned securely above a hydrothermal vent. The funnel (12) would aid in capturing the superheated fluid (11), and would also act as a venturi to increase the fluid velocity within a conduction pipe (13). Increasing velocity greatly increases the available thermal energy content at the surface.

Once the funnel (12) and preliminary pipe sections (13) are reliably positioned over a hydrothermal vent by means of the cone structure (10), the hollow cylindrical pipe sections (13) made of the same heavy, super-insulated material would be lowered one after the other on top of the structure (10) and previous sections (13) to build a continuous, vertically-oriented pipe column to the surface. Each pipe section (13) would be attached to the previous section (13), either though a tapered V-shaped gravity seal, a bolted flange, or any combination of several conventional mechanical attachments. One possible embodiment, for example, is shown in FIG. 5. Draw latches or other spring-type mechanisms could be used, as well as welding, with the optimum mechanical connection of the segments to be determined based on practicality in use.

Each pipe section (13) would have a flotation means, such as a buoyancy collar (17) attached, which would be inflated to provide 95% or more buoyancy. This would minimize the cumulative weight on the support structure or conically shaped framework (10) at the ocean floor, and would also provide vertical stability, since any tipping of the pipe would tend to automatically correct itself. Mooring (not shown) at intervals could also be used as needed to stabilize the vertical pipe (13) column.

Pipe sections (13) would be added end to end, one after another, until a very long, highly insulated pipe had been constructed, extending from the sea floor (18) to the surface of the ocean (16). Since fluid pressure inside the pipe (13) at the bottom would be equal to the outside pressure, no special consideration would have to be given to building a pipe (13) capable of withstanding extreme ocean depth pressures. There could be higher pressure within the pipe than is exerted by the ocean as the fluid moves closer to the surface.

Referencing FIG. 4, by stacking pipe sections of pipe (13) in this manner, one on top of the other, a highly insulated duct would be created to carry the superheated fluid (11) to the ocean surface (16), and the heat energy the fluid contains would then be used to drive steam turbines or other equipment for electricity generation (110), water desalination (150), other thermal energy uses, and it could also be simultaneously or separately fed into resource recovery equipment (152) for the recovery of valuable minerals, metals, and chemicals as illustrated in FIG. 4. An electrically or mechanically operated valve, (not shown), can be placed in the pipeline at or near the bottom to allow fluid flow to be interrupted for maintenance or during construction.

Because the pipe sections (13) are heavily insulated, the fluid (11) remains isolated from both ocean currents and cold water. There is no place for the heat to go, so the fluid (11) remains hot. When the stacked pipe sections of pipe (13) reach the ocean surface (16), the entire system is conceptually similar to an extremely tall and well-insulated saucepan, with the heat source at the bottom keeping the entire column of fluid heated. In this manner, superheated fluid (11) will be ducted to the surface (16) of the ocean with very little loss of heat compared to its origination temperature at the bottom. The only loss would be that which escaped through the insulation. It is expected that some heat would also be added from friction of the fluid (11) inside the pipe (13).

Once the superheated fluid (11) has been ducted to the ocean surface (16), any practical technology could be harnessed to utilize the heat therein to accomplish work. If electricity were generated on site, it would then be carried to land using undersea cables or other means. It is envisioned that successive thermal energy systems could be combined in series and parallel until all recoverable, practical heat contained in the fluid has been converted to useful work. The remaining fluid (11) would then be returned to the ocean depths from whence it originated via an uninsulated return pipe (26).

Referring to FIG. 3, an alternative is disclosed for bringing superheated working fluid (39) to the ocean surface (16) wherein a closed-loop system filled with clean fluid, liquid or gas (39) is employed, with a heat exchanger (38) at the bottom subjected to the direct heat of the vent output. The clean working fluid would be heated within the exchanger (38) and protected in the same manner through the insulated pipe (13) for surface delivery of superheated fluid for thermal energy conversion, and then sent back, driven by natural convection and/or return pumps (40) through a return pipe line (44) which is insulated to conserve the remaining heat in the working fluid and allow it to be reheated again to even higher temperatures within the heat exchanger.

A thermal differential enhancement pipe (19) can also be used with either the open or closed loop system to increase the temperature differential, and thereby increase available energy at the surface. It would consist of nothing more than an insulated pipe that is open at both ends, and extends upward from near the sea floor (18) and which extends above the surface (16) by several feet to keep surface water from mixing with water contained within the pipe.

The input of a cold water pump (32) would be placed within the open top of the pipe and water removed from its surface to be used for the cold side of any heat energy utilization system. As water is withdrawn from the pipe, atmospheric pressure refills it at the only point open to the sea, the bottom, where water temperatures are about 2° C. (35° F.). Within a short time the only water within that heavily insulated pipe would be that which originated at the bottom. Using that extremely cold water instead of ambient air or surface water for the cold side of any power recovery system will dramatically increase the thermal energy available from the system by increasing the overall temperature differential above ambient temperature by 15 degrees C. or more.

In the preferred embodiment, FIG. 4, a platform (24) similar to an oil platform would be located where the pipe (13) reaches the surface (16), and upon which the energy utilization (110, 150) and/or resource recovery equipment (152) would be located. Tension-leg platforms or semi-submersible platforms with either static or dynamic positioning or any of several other technologies could be used to keep the platform in position above the pipe (13). Ships could also be used in place of platforms.

Since hydrothermal vents (15) have different configurations, different embodiments will be used for trapping the hydrothermal fluid (11).

Some vents (15) on the Juan de Fuca Ridge about 200 miles off the coast of Oregon are known to be as wide as 30 m (100 feet) or more in diameter. For cases such as this, with very large vents, the preferred embodiment is illustrated in FIG. 1.

It would start with detailed topographical mapping of the ocean floor (18) surrounding the vent (15). A reverse matching contour would be built into the bottom side of a ring (33), see FIG. 1 or 2, large enough to completely surround the vent (15), so that once the ring (33) is in place, it would provide a rigid and level surface to build upon, regardless of the irregularity of the ocean floor (18) below it. Anchor legs (not shown) could also be drilled through the bottom ring (33) and into the bedrock below, to be used to anchor the conical structure (10) to the ocean floor (18) if necessary.

Spoke-like arms (41) leading radially inward from the inner perimeter of the ring (33) to the outer perimeter of the pipe (13), like spokes on a wheel, would attach to, and provide support and centering for the bottom section of pipe (13) within the extremely large hydrothermal vent opening. These horizontal arms (41) would not have to support the entire weight of the built column of pipe, but would only carry the weight of the single pipe (13) section to which it is attached. This first (lowest) section of pipe (13) would be positioned in such a way that it extends as deep down into the center of the vent (15) as possible, to recover fluid (11) at the highest possible temperature. In such circumstances, a funnel (12) at the bottom would act as a venturi to increase fluid velocity within the pipe (13), similar to the way in which a garden hose nozzle increases the velocity of the stream of water it ejects. This increased velocity increases the available energy content at the surface (16).

Several angled legs (54) would attach the largest ring (33) to several smaller concentric rings (50, 51 and 52), supporting each of them at a higher elevation above the ocean floor (18). The vertical distance separating the rings would be equal to the height of one section of pipe (13).

Arms (41) with a similar spoke configuration within that ring would provide support and centering for the second section of pipe (13), which would then be attached to the lowest pipe section (13). This process would carry on by adding other yet smaller concentric rings (51 and 52) attached by legs (54) to the second largest ring, and continuing in the same manner, with each ring smaller and at a progressively higher elevation than the last, and each with its own spoke-configured arms (41) that radiate back to the center, supporting only the weight of the one single pipe section (13) to which it is attached. Several progressively smaller concentric rings would be used, raising the structure's (10) height in a cone shape as each was added.

When the desired diameter of the smallest ring (72) is finally reached, where its inside diameter is equal to the outside diameter of the pipe (13) itself, it is this segment at the top of the cone (72) that would take the weight of the column of pipe above. The load would then be transferred to that smallest ring, and through the support legs (54) that attach each ring of cone structure to the larger one beneath it, until the load is distributed evenly onto the largest ring (33) at the bottom, and ultimately to the ocean floor (18) below.

The entire cone shaped framework (10) with central pipe sections (13) and funnel (12) installed, would probably, but not necessarily, be built on board a ship or some other surface facility and then lowered into place as a complete unit, ready to accept the first weight-bearing section of pipe (13) and the others that will follow.

Alternately, and referring to FIG. 2, the large cone structure (10) described earlier could be modified for use in vent (15) fields with many smaller vents (15) located in a small geographic area. By surrounding, trapping, and combining the outputs of many small vents (15) through smaller insulated pipes (99) into one large insulated pipe (13) at the top of the cone structure (72), a large volume of fluid (11) could be collected from several vents (15) for transit to the surface. Support legs (not shown) could also be drilled through the bottom ring (33) into the seabed surface for additional stability.

As a resource recovery system (shown in FIG. 4), the same invention provides a reliable mechanism for bringing resource-rich fluids (11) to the surface for exploitation without modification.

The hottest vents, called "black smokers", carry copious quantities of many valuable metals, minerals, and chemicals including iron, gold, silver, copper, zinc, cadmium, manganese, and sulfur, along with significant amounts of methane gas mixed into the fluid. Halides, sulphates, chromates, molybdates and tungstates are also abundant. As the fluid (11) rises through the pipe (13), the minerals and metals it contains rise to the surface with it. It would be fed into resource recovery equipment (152) or loaded onto ships to be transported for processing elsewhere, and any unwanted minerals, products, or excess hot fluid remaining from the heat energy or resource recovery process would then be returned back to the ocean floor via a return pipe (26) of similar but uninsulated construction that is not located over a hydrothermal vent. Any practical form of mining facility could be used depending upon the particular mineral or other substance that is to be mined. Resource recovery could also be done independently from any heat recovery if desired.

Referring to FIG. 3, there is provided a closed loop hydrothermal energy recovery system. In this case, a platform (24) would also be used in a manner similar to that shown in FIG. 4. A hydrothermal power plant (110) as shown in FIG. 3, would be operated along with a desalination facility (150). The hydrothermal fluid itself is not ducted to the surface for mineral recovery, but rather the heat is transferred to the working fluid through a heat exchanger, and the heated fluid is then used to generate electricity, desalinate water, or for other thermal energy use before being returned to the bottom for reheating.

FIGS. 5A and 5B illustrate a flexible pipe joint which may be used in the present invention. FIG. 5A shows a pair of pipe sections (200) and (202) with the upper end of the pipe section (202) being connected to the lower end of the pipe section (200). The lower end of the pipe section (200) may be provided with an outwardly extending flange (204) and in like manner the upper end of the pipe section may be provided with an outwardly extending flange (206). A spring mechanism (208) is inserted there between. This allows for a flexible coupling allowing movement of the two pipe sections relative to one another in the event of ocean currents without sacrificing the security of the contents on the interior thereof.

Thus, there has been illustrated and described a unique and novel hydrothermal energy and deep-sea resource recovery system, and which thereby fulfills all of the objects and advantages which have been sought. It should be understood that many changes, modifications, variations and other uses and applications will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A system for recovery of a resource contained in a hydrothermal fluid from a hydrothermal vent, said system comprising:
   collecting means for collecting a hydrothermal fluid or a resource contained in that hydrothermal fluid from a hydrothermal vent;
   an ocean based recovery station located at or above the ocean surface for receiving the hydrothermal fluid or a resource contained therein;
   delivery means for delivery of the hydrothermal fluid or a resource contained in the fluid from the vent to the ocean based recovery station while protecting the fluid or a resource contained in the fluid from ambient ocean conditions without significant degradation of the hydrothermal fluid or a resource in that fluid;
   means for converting at least a portion of the resource contained in the hydrothermal fluid to a second form of energy;
   means for transferring the second form of energy to land.

2. The system for recovery of a resource contained in a hydrothermal fluid exiting a hydrothermal vent of claim 1, said system comprising:
   a pipe arrangement extending between the vent and the recovery station for delivery of the hydrothermal fluid or a resource contained therein directly from the vent to the recovery station.

3. The system for recovery of a resource contained in the hydrothermal fluid exiting a hydrothermal vent of claim 2 further characterized in that said system comprises:
   a) means to extract a resource in the hydrothermal fluid and delivering the resource to the recovery station.

4. The system for recovery of a resource contained in the hydrothermal fluid exiting a hydrothermal vent of claim 2 further characterized in that said system also comprises:
   a) a funnel sized to be located over or in a hydrothermal vent to receive and deliver the hydrothermal fluid to the pipe arrangement, to operate as a venturi to increase fluid flow.

5. The system for recovery of a resource contained in the hydrothermal fluid exiting a hydrothermal vent of claim 4 further characterized in that said resource in the hydrothermal fluid is heat energy, and that said system further comprises:
   a) insulation means surrounding the pipe arrangement to protect the heat energy contained in the hydrothermal fluid.

6. The system of claim 1, wherein the resource contained in the hydrothermal fluid comprises heat energy, and the converting means converts at least a portion of the heat energy from the hydrothermal fluid to electricity, and the transferring means transfers the electricity to land.

7. A system for delivery of hydrothermal fluid extracted from an ocean hydrothermal vent to enable recovery of hydrothermal energy therefrom above the ocean floor, said system comprising:
   collecting means in close proximity above the ocean floor or extending into the hydrothermal vent for collecting at least the hydrothermal energy contained in fluid vented from the ocean hydrothermal vent;
   an ocean based hydrothermal energy recovery station at or above the surface of the ocean for recovering heat energy; and
   pipe means operatively connected to said collecting means for delivery of the hydrothermal energy to said recovery station above the ocean surface;
   a waste fluid return station for return of the spent fluid to the ocean floor after heat energy has been extracted therefrom;
   means for converting at least a portion of the heat energy from the fluid into electricity; and
   means for transferring the electricity to land.

8. The system for delivery of hydrothermal energy from hydrothermal fluid of claim 7 further characterized in that said collecting means of said system comprises:
   a) a funnel which is sized and shaped to extend over a portion of a hydrothermal vent and collect a substantial amount of the hydrothermal fluid exiting said hydrothermal vent, while also acting as a venturi to increase fluid flow within the pipe.

9. The system for delivery of hydrothermal energy from hydrothermal fluid of claim 8 further characterized in that said funnel is connected to a lower end of said pipe means.

10. The system for delivery of hydrothermal energy from hydrothermal fluid of claim 7 further characterized in that said system comprises:
   a) a plurality of hydrothermal collecting means and each of said collecting means being operatively connected to said pipe means for delivery of hydrothermal energy from a plurality of hydrothermal vents to said recovery station.

11. The system for delivery of hydrothermal energy from hydrothermal fluid of claim 7 further characterized in that said system comprises:
   a) said collecting means being constructed so that it is capable of capturing hydrothermal fluid exiting the hydrothermal vent and delivery of that fluid through the pipe means to the recovery station.

12. The system for delivery of hydrothermal energy from hydrothermal fluid of claim 7 further characterized in that said system comprises:
   a) heat exchange means located in proximity to a hydrothermal vent for heating a delivery water supply which rises through said pipe means and the water delivery supply is recirculated for reheating after extraction of the heat energy.

13. The system for delivery of hydrothermal energy from hydrothermal fluid of claim 7 further characterized in that said system further comprises:
   a) a framework which can be supported on an ocean floor in proximity to a hydrothermal vent; and
   b) said collecting means and said pipe means are mounted on and carried by said framework.

14. The system for delivery of hydrothermal energy from hydrothermal fluid of claim 7 further characterized in that said pipe means comprises:
   a) a plurality of axially connected pipes which are sized to carry hydrothermal fluid and which are connected together.

15. The system for delivery of hydrothermal energy from hydrothermal fluid of claim 14 further characterized in that said system further comprises:
   a) a flotation collar attached to at least one of a pair of pipes at a point of joinder or other point on said pipes to provide buoyancy to at least one of a pair of pipes.

16. A system for delivery of resource bearing hydrothermal fluid from an ocean hydrothermal vent to enable recovery above the ocean floor of the resource contained in hydrothermal fluid, said system comprising:
   collecting means in close proximity to the ocean floor for collecting the hydrothermal fluid or a resource contained in the hydrothermal fluid vented from the ocean hydrothermal vent;
   an ocean based resource recovery station at or above the surface of the ocean for recovering a resource contained in the hydrothermal fluid;
   pipe means operatively connected to said collecting means for delivery of the hydrothermal fluid along with the resource, to said recovery station above the ocean surface;
   a waste fluid return station for return of the spent fluid to the ocean floor after a resource has been extracted therefrom;
   means for converting at least a portion of the resource of the hydrothermal fluid into a second form of energy; and
   means for transferring the second form of energy to land.

17. The system for delivery of a resource bearing hydrothermal fluid of claim 16 further characterized in that said system comprises:
   a) a plurality of hydrothermal collecting means and each of said collecting means being operatively connected to said pipe means for delivery of said resource bearing hydrothermal fluid from a plurality of hydrothermal vents to said recovery station.

18. The system for delivery of a resource bearing hydrothermal fluid of claim 16 further characterized in that said system comprises:
   a) said collecting means being constructed so that it is capable of capturing a hydrothermal fluid resource exiting the hydrothermal vent in proximity to the vent and delivery of that resource through the pipe means to the recovery station.

19. The system for delivery of a resource bearing hydrothermal fluid of claim 16 further characterized in that said system further comprises:
   a) a framework which can be supported on the ocean floor in proximity to a hydrothermal vent; and
   b) said collecting means and said pipe means are mounted on and carried by said framework.

20. The system for delivery of a resource bearing hydrothermal fluid of claim 19 further characterized in that said pipe means comprises:
   a) a plurality of pipes connected in any practical manner which are sized to carry hydrothermal fluid or a resource contained therein and which are connected together.

21. The system of claim 16, wherein the resource contained in the hydrothermal fluid is heat energy, and wherein the converting means converts at least a portion of the heat energy from the hydrothermal fluid into electricity, and the transferring means transfers the electricity to land.

22. A method for generating electricity from heat recovered from an ocean hydrothermal vent, said method comprising:
   collecting heat from a hydrothermal vent;
   delivering the heat from the hydrothermal vent to an ocean based recovery station at or above the ocean surface;
   maintaining the heat above a desired temperature while delivering the heat from the hydrothermal vent to the ocean based recovery station;
   generating electricity at the ocean based recovery station using the heat; and
   transferring the electricity to land.

23. The method of claim 22, including the steps of:
   collecting hydrothermal fluid from the ocean hydrothermal vent;
   maintaining the hydrothermal fluid above a desired temperature during the delivery step;
   using the hydrothermal fluid to generate electricity; and
   returning the spent hydrothermal fluid to the ocean floor.

24. The method of claim 23 further characterized in that said method comprises:
   a) delivering the hydrothermal fluid directly from the vent to the recovery station through a pipe arrangement extending between the vent and the recovery station.

25. The method of claim 24 further characterized in that said method comprises:
   a) locating a funnel over or in a hydrothermal vent, receiving and delivering the fluid contained therein to the pipe arrangement extending to the recovery station.

26. The method of claim 23, including the step of recovering a resource contained in the hydrothermal fluid at the recovery station.

27. The method of claim 22, including the step of using the heat to desalinate ocean water.

28. The method of claim 22, wherein the collecting heat step includes the step of circulating a fluid in a pipe arrangement extending between the hydrothermal vent and the recovery station.

29. A system for recovery of heat from a hydrothermal fluid exiting a hydrothermal fluid exiting a hydrothermal vent and generating energy therefrom, said system comprising:
 means for delivering from a hydrothermal vent to a recovery station a hydrothermal fluid exiting the hydrothermal vent;
 a power plant using the heat from the hydrothermal fluid to generate energy, and leaving a spent hydrothermal fluid;
 cold water pumping means for delivery of cold water extracted from the ocean to the power plant for enhancing the temperature differential; and
 means for transferring at least a portion of the generated energy to land.

30. The system for delivery of hydrothermal energy from hydrothermal fluid of claim 29 further characterized in that the energy contained in the hydrothermal fluid is used to operate a desalination facility to thereby generate desalinated water.

31. The system for delivery of hydrothermal energy from hydrothermal fluid of claim 29 further characterized in that said system comprises:
 a) a waste water pumping means for returning the spent hydrothermal fluid to the ocean bottom.

32. The system for recovery of a resource contained in a hydrothermal fluid of claim 29 further characterized in that:
 a) the system comprises means for delivery of the hydrothermal fluid from the vent to the power plant.

33. The system for recovery of a resource contained in a hydrothermal fluid of claim 29 further characterized in that the system comprises:
 a) a heat exchange mechanism to deliver only the heat used but not the hydrothermal fluid to the power plant.

* * * * *